Jan. 2, 1951    L. A. CLOUSING ET AL    2,536,037
AIR-SPEED MEASURING DEVICE
Filed June 17, 1946
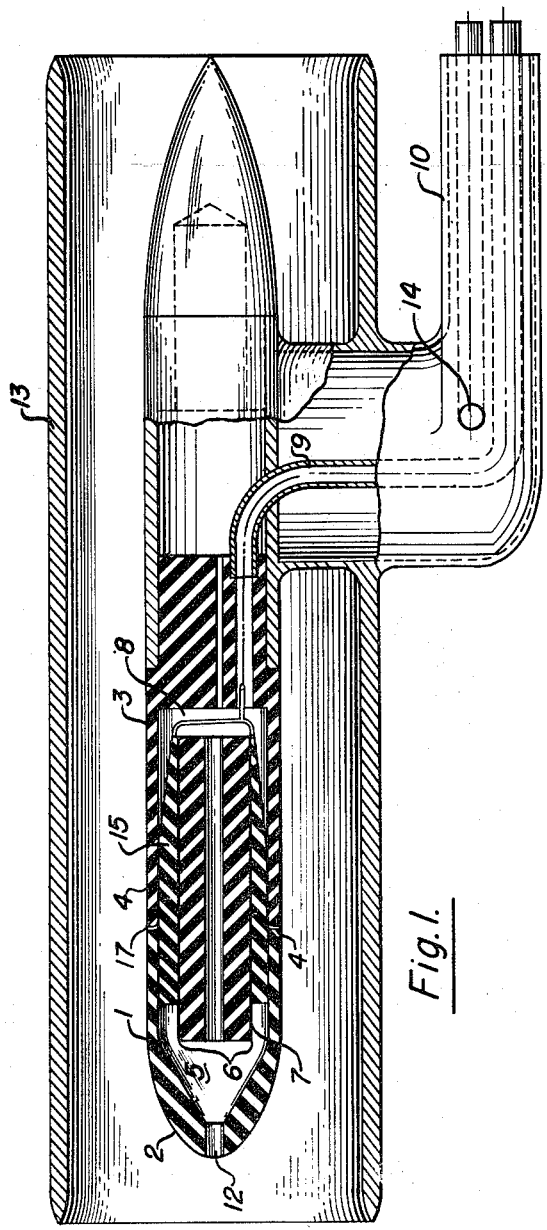
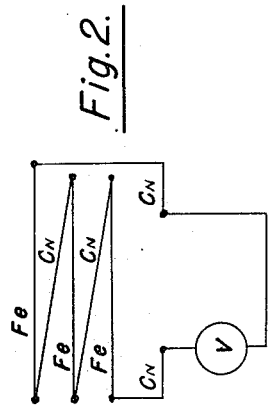
Inventor
Lawrence A. Clousing
Lester M. Tint
By F. Schmitt
Attorney Patented Jan. 2, 1951

2,536,037

UNITED STATES PATENT OFFICE 2,536,037

AIR-SPEED MEASURING DEVICE

Lawrence A. Clousing, Los Altos, and
Lester M. Tint, Palo Alto, Calif.

Application June 17, 1946, Serial No. 677,146

9 Claims. (Cl. 136—4)

(Granted under the act of March 3, 1883, as
amended April 30, 1928; 370 O. G. 757)

This invention is directed to an airspeed measuring device and particularly to a device by means of which airspeed might be measured through the application of the different values of impact or compressive heating of different parts of a body in its passage through air.

The measurement of airspeed as the speed of sound is approached becomes very difficult, and becomes more difficult as speeds exceed those of sound.

An object of this invention is to develop a device which makes airspeed measurement more accurate as speed is increased.

Another object is a device which measures true airspeed directly and is, therefore, very helpful in aerial navigation and military uses.

Other objects will become apparent from a description of the following drawings in which:

Fig. 1 is a sectional view; and

Fig. 2 is a schematic showing of the thermocouple arrangement.

The theory underlying the device is explained as follows:

$$\tfrac{1}{2}MV^2 = WC_p\Delta tJ = \text{energy}$$

where

M = mass
V = velocity
W = weight
$C_p$ = specific heat of constant pressure
$\Delta t$ = temperature rise
J = mechanical equivalent of heat therefore $$\Delta t = \frac{1}{2}\frac{MV^2}{WC_pJ} = \frac{V^2}{2gC_pJ}$$

The present device is operable in any gas or fluid and is not limited to operation in air alone The temperature rise due to the sudden stopping of a particle traveling at velocity V, is $$V^2/2gC_pJ$$

A curve showing this temperature rise as a function of velocity can be computed and plotted. Thus, at the point of stagnation on a body, a theoretically maximum temperature rise takes place. However, on some other point of a body, dependent upon the shape of the body and the location of the point, a temperature rise of some smaller amount occurs. The difference between the temperature rise at these two points could thus be a measure of airspeed. The utilization of this difference in rise in temperature is the basis of operation of the present device.

In the preferred form of the invention as shown in Fig. 1 the measuring device is a smooth cylindrical body 3 with streamline nose 2 and with a diameter a fraction of its length. The nose 2 is hollow and is made of low thermal conductivity material. A hole 12 drilled coaxially through the nose leads to forward cavity 5 in which are mounted the hot junctions 6 of a large number of thermocouples connected in series as shown in Fig. 2. From the forward cavity 5, the wires of the thermocouples are led through a sealed portion 15 of the head to another cavity at the rear and out to the cold junctions 4 which are mounted flush diametrically on the periphery of the head and pass through small radial holes 17 just back of the elliptical contour. The head is so constructed that the air entering hole 12 is conducted through from the front to the rear cavity and out tube 9 in the support. Tube 14 is mounted within the support back of the head to serve as a static vent in controlling the flow of air through the hole in the nose.

Shield 13 covers the device to lessen the effects of solar radiation if the device were to be used on an airplane. An air bleed may be incorporated to provide more rapid response to varying conditions.

In operation fluid flow parallel to the axis of revolution of head 1 impinges on the front of nose 2. The temperature of the fluid is raised by the heat of adiabatic compression at the stagnation point.

As this adiabatically compressed air passes in laminar flow around the sides of body 3, it gives up heat to the surrounding air mass. It changes heat energy into velocity energy and into energy of expansion. This lowers its temperature, which lower temperature is measured by the cold junctions 4 around the periphery of the body.

The air stagnated at the nose 2 and heated by adiabatic compression is slowly bled into front cavity 5 where its temperature may be faithfully measured by the hot junctions 6. Were all the dammed air to be allowed to pass around the sides of body 3, the air surrounding hot junctions 6 would be cooled by some heat being conducted out through the walls of head 1 to the cooler air passing by it, and thus the true temperature of the adiabatic compression would not be measured. The bleeding is, therefore, accomplished by connecting the forward cavity by means of tube 7 to rear cavity 8, then the flow moves rearwardly by means of tube 9 to a point of flow control and into static vent 14 in support 10 behind the head.

To insure a minimum of heat transfer through any part of head 1, the material of which it is constructed is a plastic of very low heat conductivity, such as for example Bakelite. The temperature difference between the air stagnated at the nose and the same air as it passes around the body, that is, the temperature difference measured by the hot and cold junctions, is a function of true airspeed, and for a very smooth body of large fineness ratio, the flow around which is independent of Reynolds number, the measurement of airspeed by this temperature differential under these conditions is independent of altitude. For the flow to be independent of Reynolds number, the fineness ratio of the body must be large and consequently the temperature differential of the flow will be small. This necessitates a maximum number of junctions in the thermopile in order to produce voltage drop large enough to give accurate readings on a rugged millivoltmeter suitable for flight.

The flow from the time the fluid impinges at the nose until it passes well behind the diameter of the cold junctions must be laminar for the above conditions to exist, because the energy transfers of the airflow must be functions only of the stagnation and friction of the flow around the body, and must not be affected by any turbulence which may cause separation of the boundary layer ahead of the cold junction diameter and which may complicate the relationships of energy transfer in the airflow such as to render the scheme useless for measurement of true airspeed independent of altitude. Keeping the surface of the entire head and the support immediately behind it as smooth as possible, as well as maintaining a large fineness ratio will raise the critical speed of the head.

For flight work the head must be well shielded against external radiation which would produce errors in the temperature measurement of the external thermocouples. Tube 13 acts as the radiation shield.

The length of the wires forming the thermopile are made as long as practicable to reduce heat transfer from the hot to the cold junctions.

For measuring airspeed the location and installation of the instrument is governed by the same factors which control the mounting of a Pitot-static airspeed head for flight.

The instrument may be used with electrical leads of fixed and known resistance connected to a millivoltmeter or microammeter as shown schematically in Fig. 2. The electrical meter is then calibrated to read airspeed directly for the particular installation or any identical installation.

Several designs of the device may be used. In each case the temperature rise is measured at several points by means of thermocouples or by a number of thermocouples in series to raise the sensitivity of the measurements. The leads from the thermocouples may be connected to standard electrical measuring instruments for showing speed.

It may be that modifications of the device may have different calibrations at different Reynolds and Mach numbers even though at the same true speed. If this is necessary the applicability of the device would be lessened but by no means rendered useless. Testing the refinement of the device may show body shapes and position of the thermocouples such that the same calibration would apply over wide ranges of Mach and Reynolds numbers.

Applicant does not wish to be limited to the particular modification disclosed. The scope of the invention is defined in the appended claims.

The invention described herein may be manufactured and used by or for the Government of the United States of America for governmental purposes without the payment of any royalties thereon or therefor.

What is claimed is:

1. A device for measuring speed in a fluid comprising a cylindrical body having a cavity therein, a streamlined head on said body having a tapered nose of material of low heat conductivity, said head having a passage therethrough communicating with said cavity, means in said cavity for measuring the temperature of impinged air at said nose, and means for measuring the temperature of air on said body at a point remote from said nose whereby a temperature differential can be obtained to indicate velocity.

2. A device for measuring speed in a fluid comprising a cylindrical body having a cavity therein, a streamlined head on said body having a nose of material of low heat conductivity, said head having a passage therethrough communicating with said cavity, means in said cavity for measuring the temperature of impinged air at said nose, means for measuring the temperature of air on said body at a point remote from said nose whereby a temperature differential can be obtained to indicate velocity, and a radiation shield surrounding said body.

3. A speed measuring device comprising a cylindrical body having a cavity therein, a tapered nose on said body of material of low thermal conductivity, said nose having an axial aperture therethrough communicating with said cavity, and a thermocouple having its hot junction positioned in said cavity and its cold junction positioned on the surface of said body at a point remote from said nose.

4. A device according to claim 3, and a radiation shield surrounding said body.

5. A device for measuring speed in a fluid comprising a cylindrical body having a cavity therein, a head on said body having a tapered nose of material of low heat conductivity, said nose provided with a perforation communicating with said cavity, a plurality of thermocouples connected in series and having their hot junctions mounted in said cavity, the cold junctions of said thermocouples being mounted flush diametrically on the periphery of the head to indicate temperature differential, and means to conduct air from said cavity.

6. A device for measuring speed in a fluid comprising a cylindrical body having a cavity therein, a head on said body having a tapered nose of material of low heat conductivity, said nose provided with a perforation communicating with said cavity, a plurality of thermocouples connected in series and having their hot junctions mounted in said cavity, the cold junctions of said thermocouples being mounted flush diametrically on the periphery of the head to indicate temperature differential, and means to conduct air from said cavity, and a radiation shield surrounding said body.

7. A speed measuring device comprising a cylindrical body having a cavity therein, a tapered nose on said body of material of low thermal conductivity, said nose having an axial aperture therethrough communicating with said cavity, and a thermocouple having its hot junction positioned in said cavity adjacent said aperture and its cold junction positioned on the surface of said body at a point remote from said nose.

8. A speed measuring device according to claim 7, and means coupled to said thermocouple for indicating the temperature differential between said hot and cold junctions.

9. A speed measuring device according to claim 7, and indicator means coupled to said thermocouple and calibrated in terms of speed.

LAWRENCE A. CLOUSING.
LESTER M. TINT.

REFERENCES CITED

The following references are of record in the file of this patent:

UNITED STATES PATENTS

| Number | Name | Date |
|---|---|---|
| 2,006,469 | Lucke | July 2, 1935 |
| 2,412,471 | Olson | Dec. 10, 1946 |
| 2,414,370 | Floyd | Jan. 14, 1947 |

FOREIGN PATENTS

| Number | Country | Date |
|---|---|---|
| 761,973 | France | Jan. 13, 1934 |
| 805,510 | France | Aug. 22, 1936 |
| 888,695 | France | Sept. 13, 1943 |
| 665,951 | Germany | Oct. 6, 1938 |

OTHER REFERENCES

Eckert, E.: N. A. C. A., Tech. Nemo. No. 983, August 1941, pages 6 and 12.

King, W. J.: Trans. A. S. M. E., vol. 65, July 1943, pp. 423–4.

Probert et al.: J. Sc. Insts., April 1946, pp. 74–5.